United States Patent
Jia et al.

(10) Patent No.: US 8,848,636 B2
(45) Date of Patent: Sep. 30, 2014

(54) ADDRESSING SCHEMES FOR WIRELESS COMMUNICATION

(75) Inventors: Zhanfeng Jia, San Diego, CA (US); David Jonathan Julian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 379 days.

(21) Appl. No.: 13/340,440

(22) Filed: Dec. 29, 2011

(65) Prior Publication Data

US 2012/0099550 A1    Apr. 26, 2012

Related U.S. Application Data

(62) Division of application No. 12/355,008, filed on Jan. 16, 2009, now Pat. No. 8,165,080.

(60) Provisional application No. 61/091,083, filed on Aug. 22, 2008.

(51) Int. Cl.
*H04W 72/04* (2009.01)
*H04L 29/12* (2006.01)
*H04W 76/02* (2009.01)
*H04W 84/18* (2009.01)

(52) U.S. Cl.
CPC .......... *H04W 76/021* (2013.01); *H04L 61/6072* (2013.01); *H04W 76/023* (2013.01); *H04L 29/12943* (2013.01); *H04W 84/18* (2013.01)
USPC .............................. 370/329; 370/349; 455/450

(58) Field of Classification Search
USPC ........... 370/329, 349, 392, 474, 475; 455/450
See application file for complete search history.

(56) References Cited

U.S. PATENT DOCUMENTS 5,687,169 A    11/1997  Fullerton
5,764,696 A     6/1998  Barnes et al.
(Continued)

FOREIGN PATENT DOCUMENTS

| EP | 1458139 A1 | 9/2004 |
|---|---|---|
| JP | 2004343709 A | 12/2004 |
| JP | 2007251286 A | 9/2007 |
| KR | 1020080077205 | 8/2008 |

OTHER PUBLICATIONS

Anonymous: "802.15.3 IEEE Standard for Information technology—Telecommunications and information exchange between systems—Local and metropolitan area networks, Part 15.3: Wireless Medium Access Control (MAC) and Physical Layer (PHY) Specifications for High Rate Wireless Personal Area Networks (WPANs)" Internet Citation Sep. 29, 2003, pp. 1-11, XP002554557 Retrieved from the Internet: URL:http://standards.1eee.org/geti eee802/down!oad/802.15.3-2003.pdf> [retrieved on Nov. 16, 2009] the whole document.

(Continued)

*Primary Examiner* — Brian D Nguyen
(74) *Attorney, Agent, or Firm* — Paul S. Holdaway

(57) ABSTRACT

In an addressing scheme for wireless communication a communication channel may be defined based on a unique identifier associated with a destination node or a source node. In addition, a short identifier may be included in messages sent over the communication channel such that a node may uniquely identify the source node or destination node for the message. A node may use a short identifier as an index into a lookup table to determine one or more parameters to be used for communicating with another node.

56 Claims, 12 Drawing Sheets

(56) References Cited

U.S. PATENT DOCUMENTS

| | | |
|---|---|---|
| 5,812,081 A | 9/1998 | Fullerton |
| 5,832,035 A | 11/1998 | Fullerton |
| 5,907,427 A | 5/1999 | Scalora et al. |
| 5,952,956 A | 9/1999 | Fullerton |
| 5,959,546 A | 9/1999 | Dorenbosch |
| 5,960,031 A | 9/1999 | Fullerton et al. |
| 5,963,581 A | 10/1999 | Fullerton et al. |
| 5,969,663 A | 10/1999 | Fullerton et al. |
| 5,995,534 A | 11/1999 | Fullerton et al. |
| 6,031,862 A | 2/2000 | Fullerton et al. |
| 6,091,374 A | 7/2000 | Barnes |
| 6,111,536 A | 8/2000 | Richards et al. |
| 6,133,876 A | 10/2000 | Fullerton et al. |
| 6,177,903 B1 | 1/2001 | Fullerton et al. |
| 6,218,979 B1 | 4/2001 | Barnes et al. |
| 6,295,019 B1 | 9/2001 | Richards et al. |
| 6,297,773 B1 | 10/2001 | Fullerton et al. |
| 6,300,903 B1 | 10/2001 | Richards et al. |
| 6,304,623 B1 | 10/2001 | Richards et al. |
| 6,351,652 B1 | 2/2002 | Finn et al. |
| 6,354,946 B1 | 3/2002 | Finn |
| 6,400,307 B2 | 6/2002 | Fullerton et al. |
| 6,400,329 B1 | 6/2002 | Barnes |
| 6,421,389 B1 | 7/2002 | Jett et al. |
| 6,430,208 B1 | 8/2002 | Fullerton et al. |
| 6,437,756 B1 | 8/2002 | Schantz |
| 6,462,701 B1 | 10/2002 | Finn |
| 6,466,125 B1 | 10/2002 | Richards et al. |
| 6,469,628 B1 | 10/2002 | Richards et al. |
| 6,483,461 B1 | 11/2002 | Matheney et al. |
| 6,489,893 B1 | 12/2002 | Richards et al. |
| 6,492,904 B2 | 12/2002 | Richards |
| 6,492,906 B1 | 12/2002 | Richards et al. |
| 6,501,393 B1 | 12/2002 | Richards et al. |
| 6,504,483 B1 | 1/2003 | Richards et al. |
| 6,512,455 B2 | 1/2003 | Finn et al. |
| 6,512,488 B2 | 1/2003 | Schantz |
| 6,519,464 B1 | 2/2003 | Santhoff et al. |
| 6,529,568 B1 | 3/2003 | Richards et al. |
| 6,538,615 B1 | 3/2003 | Schantz |
| 6,539,213 B1 | 3/2003 | Richards et al. |
| 6,549,567 B1 | 4/2003 | Fullerton |
| 6,552,677 B2 | 4/2003 | Barnes et al. |
| 6,556,621 B1 | 4/2003 | Richards et al. |
| 6,560,463 B1 | 5/2003 | Santhoff |
| 6,571,089 B1 | 5/2003 | Richards et al. |
| 6,573,857 B2 | 6/2003 | Fullerton et al. |
| 6,577,691 B2 | 6/2003 | Richards et al. |
| 6,585,597 B2 | 7/2003 | Finn |
| 6,593,886 B2 | 7/2003 | Schantz |
| 6,606,051 B1 | 8/2003 | Fullerton et al. |
| 6,611,234 B2 | 8/2003 | Fullerton et al. |
| 6,614,384 B2 | 9/2003 | Hall et al. |
| 6,621,462 B2 | 9/2003 | Barnes |
| 6,636,566 B1 | 10/2003 | Roberts et al. |
| 6,636,567 B1 | 10/2003 | Roberts et al. |
| 6,636,573 B2 | 10/2003 | Richards et al. |
| 6,642,903 B2 | 11/2003 | Schantz |
| 6,661,342 B2 | 12/2003 | Hall et al. |
| 6,667,724 B2 | 12/2003 | Barnes et al. |
| 6,670,909 B2 | 12/2003 | Kim |
| 6,671,310 B1 | 12/2003 | Richards et al. |
| 6,674,396 B2 | 1/2004 | Richards et al. |
| 6,677,796 B2 | 1/2004 | Brethour et al. |
| 6,700,538 B1 | 3/2004 | Richards |
| 6,710,736 B2 | 3/2004 | Fullerton et al. |
| 6,717,992 B2 | 4/2004 | Cowie et al. |
| 6,748,040 B1 | 6/2004 | Johnson et al. |
| 6,750,757 B1 | 6/2004 | Gabig, Jr. et al. |
| 6,759,948 B2 | 7/2004 | Grisham et al. |
| 6,760,387 B2 | 7/2004 | Langford et al. |
| 6,762,712 B2 | 7/2004 | Kim |
| 6,763,057 B1 | 7/2004 | Fullerton et al. |
| 6,763,282 B2 | 7/2004 | Glenn et al. |
| 6,774,846 B2 | 8/2004 | Fullerton et al. |
| 6,774,859 B2 | 8/2004 | Schantz et al. |
| 6,778,603 B1 | 8/2004 | Fullerton et al. |
| 6,781,530 B2 | 8/2004 | Moore |
| 6,782,048 B2 | 8/2004 | Santhoff |
| 6,788,730 B1 | 9/2004 | Richards et al. |
| 6,822,604 B2 | 11/2004 | Hall et al. |
| 6,823,022 B1 | 11/2004 | Fullerton et al. |
| 6,836,223 B2 | 12/2004 | Moore |
| 6,836,226 B2 | 12/2004 | Moore |
| 6,845,253 B1 | 1/2005 | Schantz |
| 6,847,675 B2 | 1/2005 | Fullerton et al. |
| 6,879,878 B2 | 4/2005 | Glenn et al. |
| 6,882,301 B2 | 4/2005 | Fullerton |
| 6,895,034 B2 | 5/2005 | Nunally et al. |
| 6,900,732 B2 | 5/2005 | Richards |
| 6,906,625 B1 | 6/2005 | Taylor et al. |
| 6,907,244 B2 | 6/2005 | Santhoff et al. |
| 6,912,240 B2 | 6/2005 | Kumar et al. |
| 6,914,949 B2 | 7/2005 | Richards et al. |
| 6,917,280 B1 | 7/2005 | Griffith et al. |
| 6,919,838 B2 | 7/2005 | Santhoff |
| 6,922,166 B2 | 7/2005 | Richards et al. |
| 6,922,177 B2 | 7/2005 | Barnes et al. |
| 6,925,109 B2 | 8/2005 | Richards et al. |
| 6,933,882 B2 | 8/2005 | Fullerton |
| 6,937,639 B2 | 8/2005 | Pendergrass et al. |
| 6,937,663 B2 | 8/2005 | Jett et al. |
| 6,937,667 B1 | 8/2005 | Fullerton et al. |
| 6,937,674 B2 | 8/2005 | Santhoff et al. |
| 6,947,492 B2 | 9/2005 | Santhoff et al. |
| 6,950,485 B2 | 9/2005 | Richards et al. |
| 6,954,480 B2 | 10/2005 | Richards et al. |
| 6,959,031 B2 | 10/2005 | Haynes et al. |
| 6,959,032 B1 | 10/2005 | Richards et al. |
| 6,963,727 B2 | 11/2005 | Shreve |
| 6,980,613 B2 | 12/2005 | Krivokapic |
| 6,989,751 B2 | 1/2006 | Richards |
| 7,015,793 B2 | 3/2006 | Gabig, Jr. et al. |
| 7,020,224 B2 | 3/2006 | Krivokapic |
| 7,027,425 B1 | 4/2006 | Fullerton et al. |
| 7,027,483 B2 | 4/2006 | Santhoff et al. |
| 7,027,493 B2 | 4/2006 | Richards |
| 7,030,806 B2 | 4/2006 | Fullerton |
| 7,042,417 B2 | 5/2006 | Santhoff et al. |
| 7,046,187 B2 | 5/2006 | Fullerton et al. |
| 7,046,618 B2 | 5/2006 | Santhoff et al. |
| 7,069,111 B2 | 6/2006 | Glenn et al. |
| 7,075,476 B2 | 7/2006 | Kim |
| 7,079,827 B2 | 7/2006 | Richards et al. |
| 7,099,367 B2 | 8/2006 | Richards et al. |
| 7,099,368 B2 | 8/2006 | Santhoff et al. |
| 7,129,886 B2 | 10/2006 | Hall et al. |
| 7,132,975 B2 | 11/2006 | Fullerton et al. |
| 7,145,954 B1 | 12/2006 | Pendergrass et al. |
| 7,148,791 B2 | 12/2006 | Grisham et al. |
| 7,151,490 B2 | 12/2006 | Richards |
| 7,167,525 B2 | 1/2007 | Santhoff et al. |
| 7,170,408 B2 | 1/2007 | Taylor et al. |
| 7,184,938 B1 | 2/2007 | Lansford et al. |
| 7,190,722 B2 | 3/2007 | Lakkis et al. |
| 7,190,729 B2 | 3/2007 | Siwiak |
| 7,206,334 B2 | 4/2007 | Siwiak |
| 7,209,724 B2 | 4/2007 | Richards et al. |
| 7,230,980 B2 | 6/2007 | Langford et al. |
| 7,239,277 B2 | 7/2007 | Fullerton et al. |
| RE39,759 E | 8/2007 | Fullerton |
| 7,256,727 B2 | 8/2007 | Fullerton et al. |
| 7,271,779 B2 | 9/2007 | Hertel |
| 7,366,182 B2 | 4/2008 | O'Neill |
| 7,529,565 B2 | 5/2009 | Hilpisch et al. |
| 8,165,080 B2 | 4/2012 | Jia et al. |
| 2004/0179498 A1 | 9/2004 | Seguin |
| 2006/0256962 A1 | 11/2006 | Ilnicki et al. |
| 2007/0038793 A1 | 2/2007 | Wehage et al. |
| 2007/0061673 A1 | 3/2007 | Pan et al. |
| 2007/0156947 A1* | 7/2007 | Vaithiananthan et al. ........ 711/5 |
| 2007/0189329 A1* | 8/2007 | Latvala ..................... 370/466 |
| 2007/0201479 A1* | 8/2007 | Ishiyama et al. .............. 370/392 |
| 2007/0248114 A1 | 10/2007 | Jia et al. |

(56) References Cited

U.S. PATENT DOCUMENTS

| | | |
|---|---|---|
| 2007/0286142 A1 | 12/2007 | Prakash et al. |
| 2008/0008111 A1 | 1/2008 | Prakash et al. |
| 2008/0101358 A1* | 5/2008 | Van Ewijk et al. ........... 370/389 |
| 2009/0003291 A1* | 1/2009 | Chu et al. ...................... 370/338 |
| 2009/0037565 A1* | 2/2009 | Andresen et al. ............. 709/222 |
| 2009/0106437 A1* | 4/2009 | Mostafa et al. ............... 709/230 |
| 2009/0217135 A1 | 8/2009 | Busaba et al. |

OTHER PUBLICATIONS

"IEEE Standard for Information Technology—Telecommunications and Information Exchange Between Systems—Local and Metropolitan Area Networks—Specific Requirements Part 15.3: Wireless Medium Access Control (MAC) and Physical Layer (PHY) Specifications for High Rate Wireless Personal Area Networks", IEEE Standard; [IEEE Standard], IEEE, Piscataway, NJ, USA, Jan. 1, 2003, pp. 1-315, XP017603623, ISBN: 978-0-7381-3704-9.

International Preliminary Report on Patentability—PCT/US2009/054678, The International Bureau of WIPO—Geneva, Switzerland, Nov. 24, 2010.

International Search Report & Written Opinion—PCT/US2009/054678, International Search Authority—European Patent Office—Mar. 23, 2010.

Taiwan Search Report—TW98128305—TIPO—Apr. 9, 2013.

* cited by examiner

ADDRESSING SCHEMES FOR WIRELESS COMMUNICATION

CLAIM OF PRIORITY

The present application for patent is a Divisional of patent application Ser. No. 12/355,008 entitled "ADDRESSING SCHEMES FOR WIRELESS COMMUNICATION" filed Jan. 16, 2009, now U.S. Pat. No. 8,165,080, which claims the benefit of and priority to commonly owned U.S. Provisional Patent Application No. 61/091,083, filed Aug. 22, 2008, and assigned, the disclosure of which is hereby incorporated by reference herein.

BACKGROUND

1. Field

This application relates generally to wireless communication and more specifically, but not exclusively, to addressing schemes for wireless communication.

2. Introduction

A communication network may employ an addressing scheme to enable nodes in the network to determine the source and destination of a given message. For example, when a message is sent from one node to another, nodes in the network may determine where to route the message based on an explicit or implicit destination address associated with the message. In addition, a node that receives the message may determine which node sent the message based on an explicit or implicit source address associated with the message.

Some networks (e.g., circuit switched networks) may not use explicit addressing. For example, a circuit switched link may be point-to-point whereby the transfer of data on a given network link (sometimes referred to as a channel) implies the source node and the destination node. Such channels may be dynamically assigned to individual users. For example, in a cellular network, a base station may assign a channel to a mobile station when establishing a call.

In contrast, in a packet switched network a unique network address may be assigned to each network node. For example, each node (e.g., computer) coupled to the Internet may be assigned a unique Internet Protocol ("IP") address. Thus, a data packet routed through the Internet may include a source IP address of the source node and a destination IP address of the destination node.

Network addresses may be assigned by a single network coordinator or by a several connected network coordinators. When a node joins a network, it may first communicate with the network coordinator(s) to get a network address. One job of the network coordinator(s) may be to guarantee that the network address assignment is unique across the network.

Network addresses may be generated through negotiation. In such a case, a network coordinator may not be used. Instead, when a new node is installed on a network, the node may propose its own network address. For example, the node may broadcast its address to all nodes in the network. If another node happens to use the same address, the nodes may negotiate to resolve the conflict so that the network address used by a given node is unique in the network.

A node also may use a manufacturer specified device identifier ("ID") for addressing purposes. Such a device ID may be guaranteed to be unique. In practice, however, a device ID may be quite long (e.g., 8 bytes). Consequently, the use of a device ID for addressing purposes may result in large overhead, particularly when sending relatively small packets (e.g., on the order of 8 bytes or less).

SUMMARY

A summary of sample aspects of the disclosure follows. It should be understood that any reference to the term aspects herein may refer to one or more aspects of the disclosure.

The disclosure relates in some aspects to addressing schemes for wireless communication. The disclosed schemes may be deployed, for example, in a peer-to-peer network where a pair of network nodes may define one or more communication channels for sending a message from a source node (e.g., a transmitter) to a destination node (e.g., a receiver). Here, each network node may be assigned a long, unique identifier (e.g., a device identifier) that may be used for addressing purposes.

The disclosure relates in some aspects to defining a communication channel based on a unique identifier associated with a destination node. For example, channel parameters such as a channel acquisition code (e.g., a preamble sequence) and a time hopping sequence may be derived based on a unique identifier (e.g., a device identifier) associated with the destination node. In this way, the intended destination for a message is implicitly indicated by the channel upon which the message is transmitted. In other words, channelization is used as a destination node address. Message overhead may therefore be reduced in the network since messages sent over a given channel need not include a destination address.

The disclosure relates in some aspects to using a short identifier in a message to identify the source of the message. Here, the short identifier (e.g., a source node address) may be defined such that it enables a destination node to uniquely identify the source node. For example, the destination node may assign a unique short identifier to be used by a source node for messages sent to the designation node. Consequently, the short identifier need not be a globally unique address (e.g., a device identifier) which, as mentioned above, may be relatively long. Communication overhead may therefore be reduced in the network by using these relatively short addresses to identify source nodes.

The disclosure relates in some aspects to using a source identifier (e.g., a short identifier) received in a message to determine one or more parameters to be used to communicate with the source node. For example, a destination node may use the source identifier as an index into a lookup table to select a response channel (e.g., to determine the channel parameters to be used when sending a response to the received message to the source node). To this end, the source identifier may be used as an index to a long address (e.g., device identifier) of the source node, to security keys to be used when communicating with the source node, and to other information. Provisions also are disclosed for identifying errors in source identifier assignments and recovering from such errors.

In some aspects the disclosed addressing schemes may be employed when a first node (e.g., device) sends a data packet to a second node (e.g., device) whereupon the second node sends an acknowledgement packet to the first node. The first node is thus the transmitting node and the second node is the receiving node for the initial data packet transmission; while the second node is the transmitting node and the first node is the receiving node for the acknowledgement packet transmission.

Here, the second node may assign a short address for the first node that is unique for the second node and communicate that short address to the first node. The first node may likewise assign a short address for the second node and communicate that short address to the second node. At some point later in time, the first node sends a packet to the second node that contains the short address assigned by the second node. Upon receiving such a packet, the second node may use the short address to select a channel for sending the acknowledgement packet. To this end, the second node may use the short address to retrieve one or more channel parameters from a lookup table or the second node may derive one or more channel parameters using a long address that was retrieved from a lookup table based on the short address. The second node also may store other parameters based on the short address (e.g., a security key that is used to decode the received packet). The first node will thus receive an acknowledgement packet on a channel that is based on the first node's long address. Here, the first node may determine that the transmitter of the acknowledgement packet was the second node based on the short address that was included in the received acknowledgement packet.

The disclosure also relates in some aspects to an addressing scheme where a communication channel is defined based on a unique identifier associated with a source node. For example, channel parameters such as a channel acquisition code and a time hopping sequence may be derived based on a unique identifier associated with the source node. In this way, the source of a message is implicitly indicated by the channel upon which the message is transmitted. In other words, channelization is used as a source node address. In this case, a short address defined for the destination node may be included in the transmitted message.

BRIEF DESCRIPTION OF THE DRAWINGS

These and other sample aspects of the disclosure will be described in the detailed description and the appended claims that follow, and in the accompanying drawings, wherein:

Figure 1:
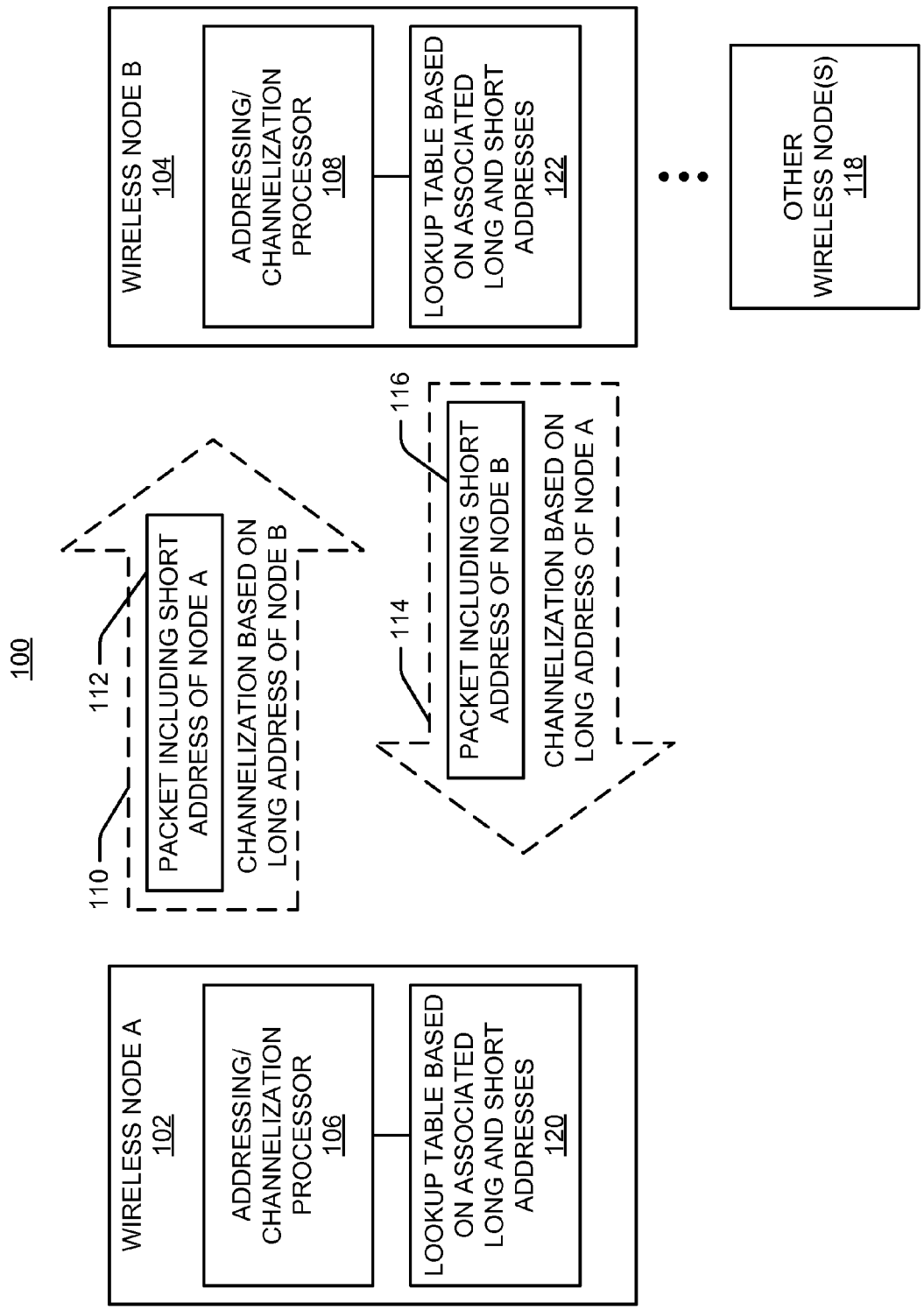
FIG. 1 is a simplified block diagram illustrating sample communication between nodes of a communication system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. As an example of the above, in some aspects a method of wireless communication may comprise: receiving a message at a first node, wherein the message comprises a first address of a second node that is associated with a second address of the second node; determining a channel at the first node based on the first address of the second node, wherein at least one parameter of the channel is derived from the second address of the second node; and responding to the message via the determined channel. In addition, in some aspects the method further comprises defining the first address at the first node; and sending the first address to the second node prior to the reception of the message.

FIG. 1 illustrates a sample communication system 100 where a wireless node 102 communicates with one or more other wireless nodes (e.g., nodes 104 and 118). Each node includes components that may provide functionality relating to one or more of the addressing schemes described herein. For example, the nodes 102 and 104 are depicted as including a respective addressing/channelization processor 106 or 108 that performs operations relating to addressing and/or channelization. These operations may include, for example, defining one or more channel parameters, providing addressing for messages (e.g., packets) sent over a channel, identifying a channel based on receive parameters, identifying a source node based on received address information, and other operations. It should be appreciated that other nodes in the communication system 100 (e.g., node 118) may include functionality similar to the functionality described herein for nodes 102 and 104.

The communication medium used by the nodes of FIG. 1 may be divided into logical or physical channels. In some aspects, a channel may be defined by a channel acquisition code, a time-hopping sequence, a frequency-hopping sequence, some other parameter, or some combination of these parameters.

In some aspects, a method of addressing a destination node for a transmission may be based on channelization. For example, the channel parameters that define a channel for communicating with a destination node may be derived based on a long identifier (e.g., a device address) of the destination node. As represented by the symbol 110, the node 102 may transmit information to the node 104 via a channel that is defined based on a long address of the node 104. Conversely, as represented by the symbol 114, the node 104 may transmit information to the node 102 via a channel that is defined based on a long address of the node 102. The nodes 102 and 104 also may transmit information to one or more other nodes (e.g., the node 118) via corresponding channels that are defined based on the long address of each of those other nodes.

In some cases, each addressing/channelization processor 106 and 108 comprises a pseudorandom number generator that uses the long address as a seed to generate the codes and/or sequences that define a channel. Thus, once the node 102 acquires the long address of the node 104, the node 102 may send a packet to the node 104 on a channel identified by (e.g., derived from) the long address of the node 104. Similarly, once the node 104 acquires the long address of the node 102, the node 104 may send a packet to the node 102 on a channel identified by (e.g., derived from) the long address of the node 102.

In some aspects, a short identifier (e.g., a short address) may be used to identify a source node. For example, a packet 112 sent via the channelization 110 may include (e.g., in a header) a short address defined for the node 102. Similarly, a packet 116 sent via the channelization 114 may include a short address defined for the node 104. Here, even though the long address of a source node could be used in the message to identify the source node, the use of this long address may result in relatively large overhead (e.g., if the long address is eight bytes and the packet payload is only four bytes). To avoid such overhead, the system 100 may therefore use the short address (e.g., one byte) to identify the source node.

The nodes 102 and 104 may include a respective lookup table 120 or 122 that stores information based on associated long and short addresses. For example, each destination node may maintain a lookup table for all possible source nodes that may communicate with the destination node. Here, a given entry of the table may contain information with respect to a given source node such as a long address (e.g., device identifier) of the source node, a short address assigned to the source node (e.g., a unique short address assigned by the destination node), one or more security keys, quality of service ("QoS") policy, duty cycle information, or some other suitable information. A security key may be used, for example, in conjunction with encrypting, decrypting, and authenticating data packets in a peer-to-peer manner. QoS policy may be used, for example, to enable priority and resource allocation. Duty cycle information may be used, for example, to align the timing between the two nodes for efficient transmissions.

When a destination node receives a message, the destination node may use the short source address included in the message to determine which source node sent the message. In particular, the destination node may use the short source address as an index into the lookup table. The destination node may therefore efficiently obtain one or more parameters for communicating with the source node. For example, the destination node may acquire one or more parameters for decoding a message from the source node. In addition or in the alternative, the destination node may acquire one or more parameters (e.g., channel parameters) for sending a message (e.g., a response) to the source node.

A short address may be defined to be valid for a given period of time or until a certain condition is met (or is no longer met). In some cases, a short address is valid for the period of time of a connection (e.g., a short address expires upon termination of a connection with another node). Thus, in such a case, the short address may not be valid forever or may not be valid only on a per-packet basis. Also, as mentioned herein, the short addresses may be different for different node pairs.

In the preceding example, the long address of a destination node is used to identify a channel and a short source identifier is used to identify the source node. In other implementations, however, a message may be sent on a channel identified by the long address of a source node and the destination of the message may be identified by a short destination address (e.g., assigned by the source node) that is included in the message. In such a case, a lookup table may be located at the source node.

In practice, the teachings herein may be employed in various types of wireless networks. For example, the nodes of FIG. 1 may be implemented in networks which may be referred to as, for example, peer-to-peer networks, mesh networks, or adhoc networks. Typically, such a network may not include a central coordinator. Rather, communication may be established between two or more arbitrary network nodes. In such a network, the nodes may frequently come and go (or be turned on and off). In addition, when a network node is in standby mode, it may not be responsive most of the time.

Sample addressing operations will now be described in more detail in conjunction with the flowchart of FIGS. 2A, 2B, and 2C. For illustration purposes, the operations of FIGS. 2A, 2B, and 2C (or any other operations discussed or taught herein) may be described as being performed by one or more of the components described herein (e.g., the components of FIGS. 1 and 3). It should be appreciated, however, that these operations may be performed by other types of components and may be performed using a different number of components. It also should be appreciated that one or more of the operations described herein may not be employed in a given implementation.

Figure 2A:
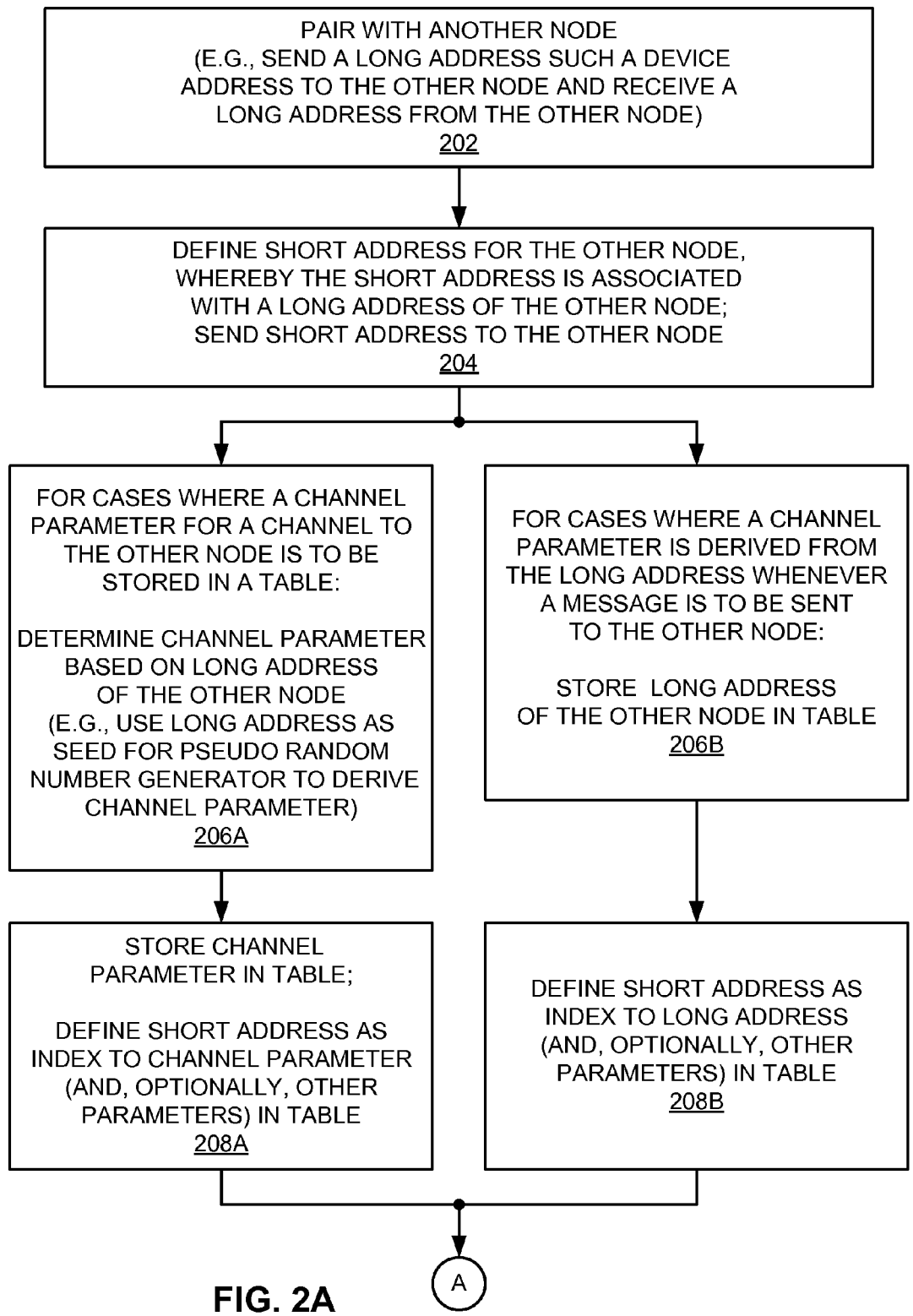
FIGS. 2A, 2B, and 2C are a simplified flowchart illustrating sample addressing-related operations.

As represented by block 202 of FIG. 2A, a node may pair with (e.g., associate with) another node. For convenience, these nodes may be respectively referred to as node 102 and node 104 in the discussion that follows. In conjunction with this operation, the node 102 may send an associated long address (e.g., the device ID of the node 102) to the node 104 and the node 104 may send an associated long address (e.g., the device ID of the node 104) to the node 102.

At block 204, a short address is defined for the node 102 and a short address is defined for the node 104. For example, each node may define a short address for the other node.

In some aspects, the short address defined for a given node may be associated with a long address of that node. In some cases the node 102 may define (e.g., using a hash function or some other function) a short address for the node 104 based on the long address the node 104 sent to the node 102. Similarly, the node 104 may define a short address for the node 102 based on the long address the node 102 sent to the node 104. Each node may then send the short address it defined for the other node to that other node. In some cases the short address (e.g., having a size of one byte) may be substantially smaller than the long address (e.g., having a size of eight bytes).

In some aspects these short addresses may be used by a destination node to identify the node that transmitted a message to the destination node. For example, when the node 102 sends a message to the node 104, the node 102 may include in that message the short address the node 102 received from the node 104. Thus, when the node 104 receives a message from the node 102 that includes that short address, the node 104 will be able to determine that the message is from the node 102. In some aspects, the short source may be unique only at the destination node. For example, several source nodes may use the same short source address when communicating with different destination nodes because these destination nodes may unilaterally assign the short source address to be used by their source nodes. For a similar reason, a given node may use different short source addresses when communicating with different destination nodes.

A short address may be defined in various ways. For example, in some cases a destination node may unilaterally specify the short address to be used by a source node. In some cases the source and destination nodes may cooperate (e.g., negotiate) to define a given short address.

In some implementations a short source address may be assigned when two nodes communicate for the first time. For example, the first packet that the node 104 sends to the node 102 may carry a message assigning the short address for the node 102. A similar assignment may happen in the other direction.

In some cases a short address may be associated with one or more parameters that are used to transmit information or to process information to be transmitted. For example, in some cases the node 102 may use its long address in a cyclic redundancy check ("CRC") operation or message integrity check operation performed on information to be transmitted. In some cases the node 102 may use a cryptographic key or other security information to process (e.g., encrypt, authenticate, etc.) information to be transmitted. In some cases the first node may apply certain quality of service (QoS) policies for the transmission of information. In some cases the first node may use certain duty cycle parameters for the transmission of information. Accordingly, this information may be provided to the second node (or the first and second nodes may negotiation to select this information) in conjunction with the transfer of the short address.

Figure 4:
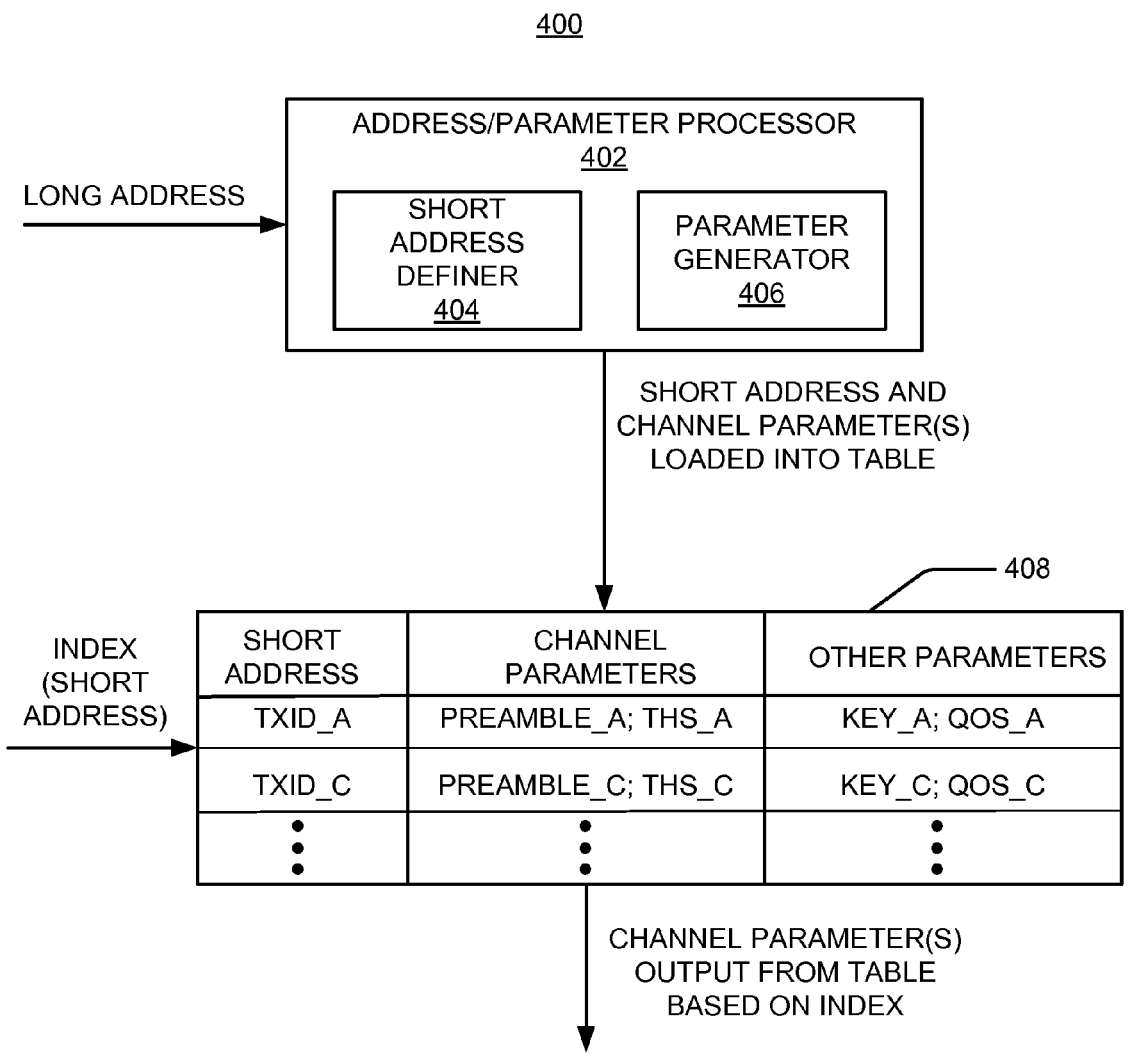
FIG. 4 is a simplified diagram illustrating a sample channel parameter derivation scheme.
Figure 5:
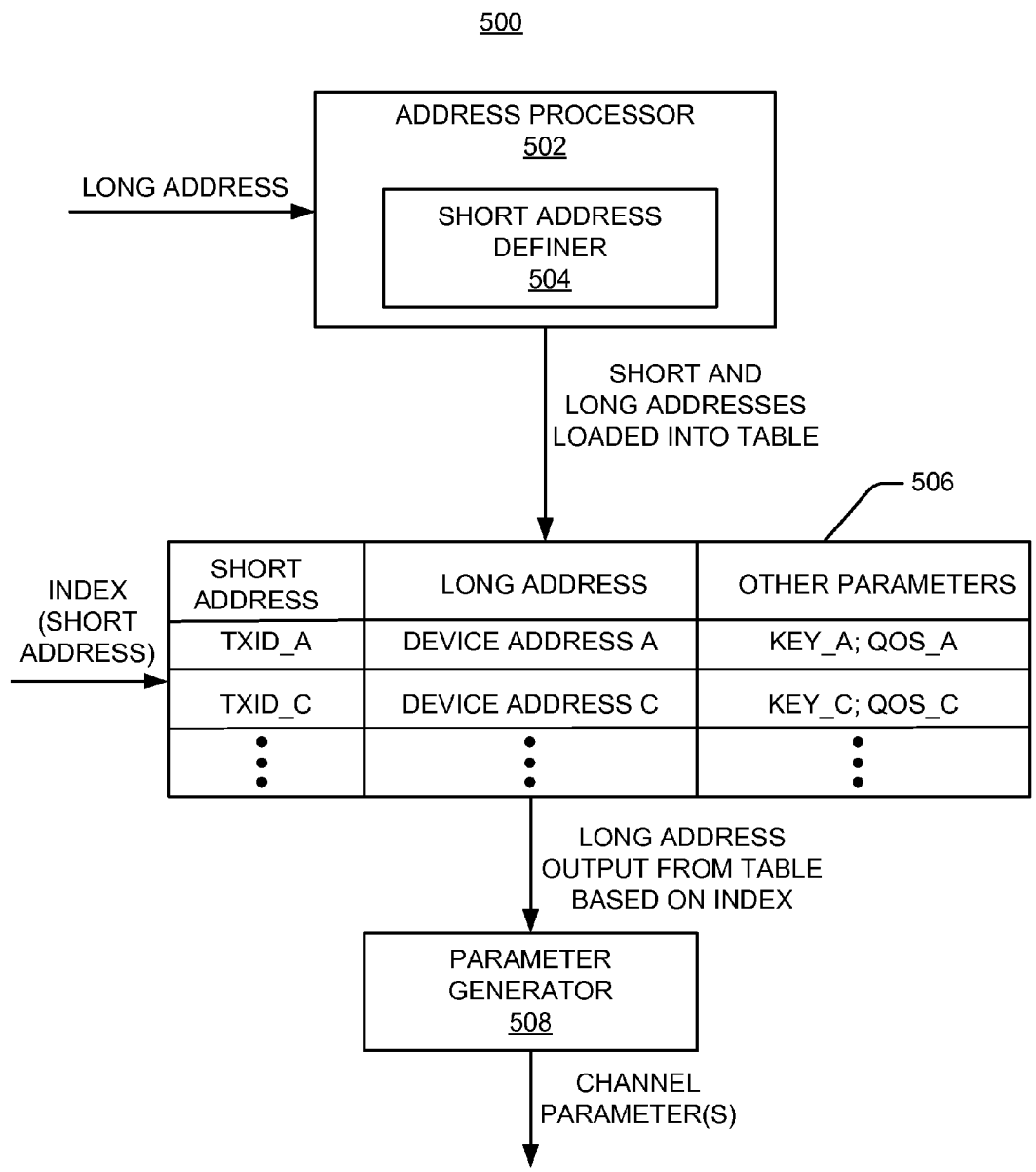
FIG. 5 is a simplified diagram illustrating a sample channel parameter derivation scheme.

As mentioned above, each short address may be used to determine a channel (e.g., derive one or more channel parameters) for communicating with a node. FIGS. 4 and 5 describe different examples of how a channel may be determined. In some aspects, a given implementation may utilize either the scheme of FIG. 4 or the scheme of FIG. 5. Both schemes will be described in the flowchart of FIGS. 2A, 2B, and 2C.

With reference to blocks 206A and 208A of FIG. 2A, FIG. 4 relates in some aspects to a scheme where an address/parameter processor 402 (e.g., a parameter generator 406) may derive one or more channel parameters based on a long address (e.g., the node 102 defines channel parameter(s) based on node 104's long address). As discussed herein, this may involve, for example, using the long address as a seed for a pseudorandom number generator to derive one or more channel parameters. Such parameters may include, for example, an acquisition and/or preamble sequence (e.g., a 64 bit sequence used for acquiring timing), a time hopping sequence, and so on. In some implementations, these channel parameters may correspond to a pulse-based (e.g., ultrawideband) system whereby the sequences correspond to one or more pulse parameters (e.g., position, polarity, and so on).

In FIG. 4, the address/parameter processor 402 (e.g., a short address definer 404) may be configured to perform the operation of defining a short address based on, for example, a long address as discussed above at block 204. For example, the node 102 may define a short address for the node 104 based on the long address of node 104.

The short address and the channel parameter(s) may be stored in a table 408 (block 208A). Here, the short address may be defined as an index into the table 408 for one or more channel parameters (e.g., a preamble sequence and time hopping sequence) and, optionally, other parameters (e.g., a security key, QoS information, and so on).

The table 408 may include different sets of information for different associated nodes (e.g., in the case where a given node may communicate with different nodes over different channels). For example, one set of information (e.g., the first information row in the table 408) may be associated with a node A, while another set of information (e.g., the second information row in the table 408) may be associated with a node C.

With reference to blocks 206B and 208B of FIG. 2A, FIG. 5 relates in some aspects to a scheme where a long address is stored in a table 506. For example, the node 102 may store the long address of node 104 in the table 506.

In FIG. 5, an address processor 502 (e.g., a short address definer 504) may be configured to perform the operation of defining a short address based on a long address as discussed above at block 204. For example, the node 102 may define a short address for the node 104 based on the long address of the node 104.

The short address also may be stored in the table 506. Here, the short address may be defined as an index into the table 506 for the long address and, optionally, other parameters (e.g., a security key, QoS information, and so on). The table 506 may include different sets of information for different associated nodes. For example, one set of information (e.g., one row in the table 506) may be associated with a node A, while another set of information (e.g., another row in the table 506) may be associated with a node C.

Figure 2B:
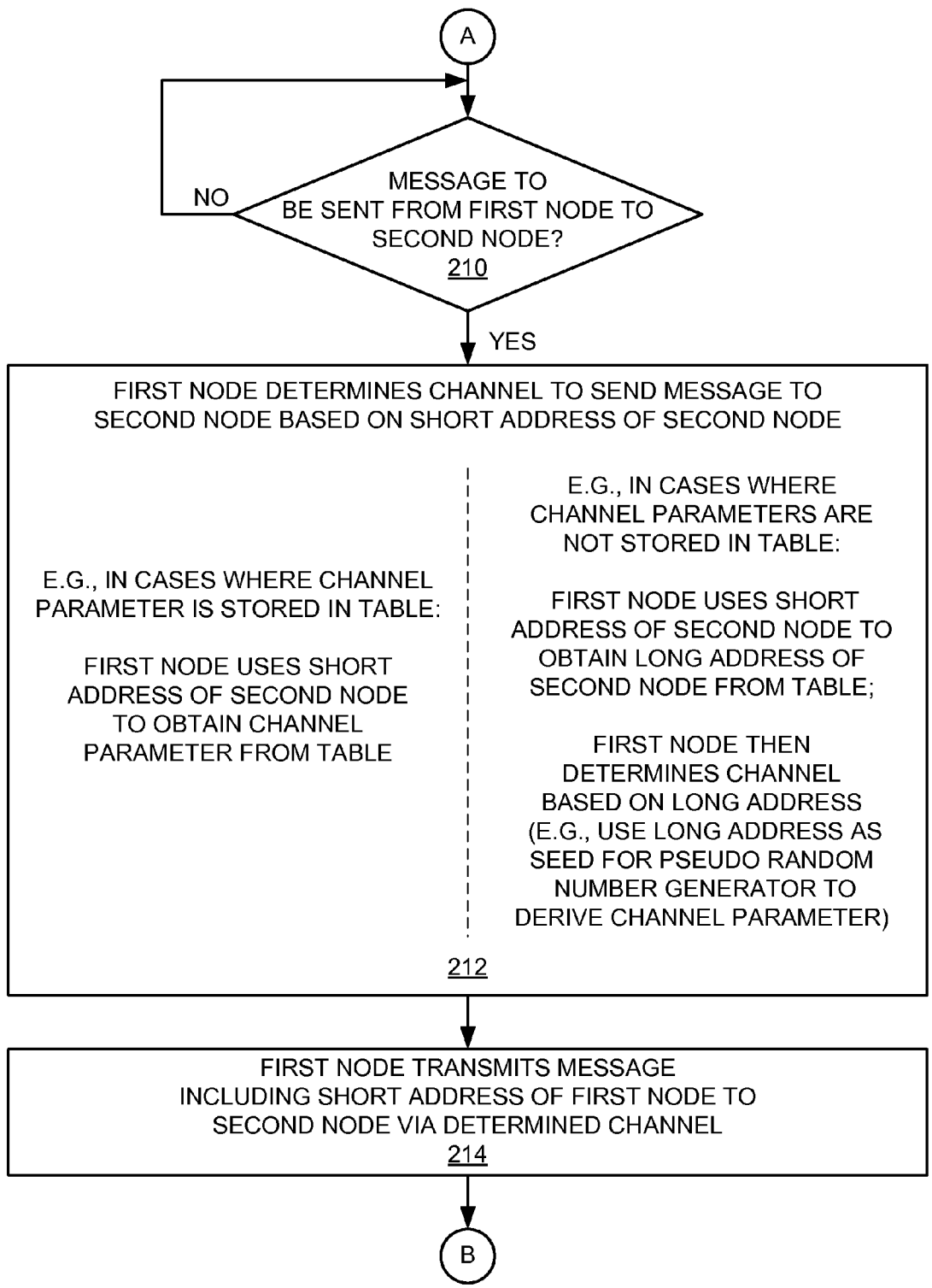

As represented by block 210 of FIG. 2B, at some point in time a message (e.g., a packet) will be sent from a first node (e.g., node 102) to a second node (e.g., node 104).

At block 212, the first node determines the channel (e.g., one or more channel parameters) to be used to send the message. In some aspects, this determination may be based on the short address of the second node. For example, in the scheme of FIG. 4 (left portion of block 212), the first node may use the short address as an index into the table 408 to obtain the channel parameters stored in the table 408.

Conversely, in the scheme of FIG. 5 (right portion of block 212), the first node may use the short address as an index into the table 506 to obtain the long address for the second node that is stored in the table 506. A parameter generator 508 may then generate the channel parameter(s) based on the long address. For example, the parameter generator 508 may use the long address as a seed for a pseudorandom number generation process as described above or for some other process.

At block 214, the first node transmits the message via the determined channel. For example, the message may be transmitted using a channel acquisition code and a time hopping sequence defined based on the long address of the second node. In addition, the message may include the short address of the first node (e.g., the short address defined by the second node for the first node at block 204).

Figure 2C:
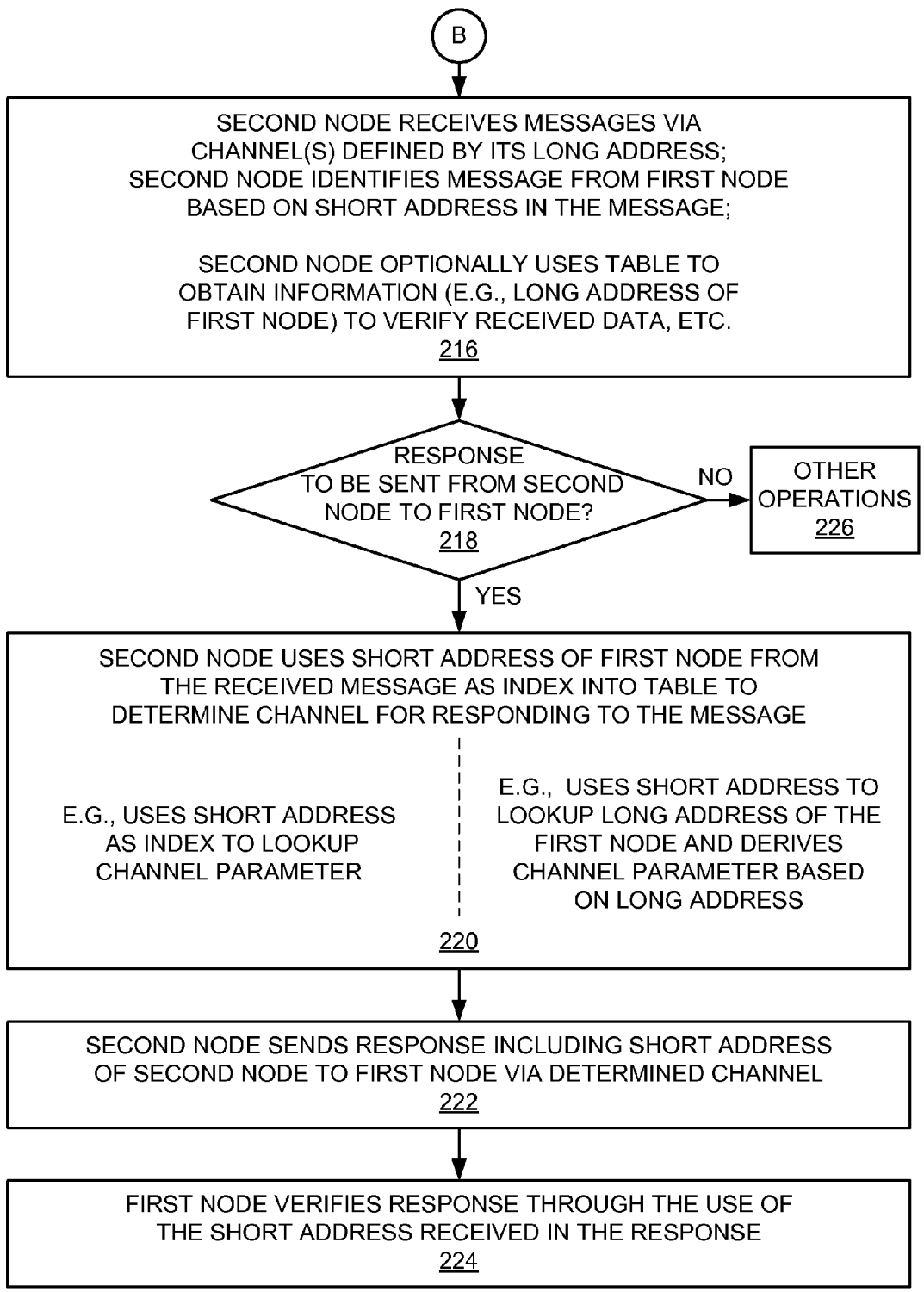

At block 216 of FIG. 2C, the second node receives the message via the channel that was defined based on the second node's long address (at blocks 212 and 214). Here, the second node may monitor (e.g., on regular basis) for any messages that have been transmitted using a channel acquisition code and a time hopping sequence (or any other suitable parameters) that are defined based on the long address of the second node. In the event such a message is received, the second node may identify the sender of the message (e.g., the first node) based on the short address included in the message.

In some implementations the second node may use the short address to lookup information in a lookup table (e.g., table 408 or 506) that may be used to process information received via the message. For example, the second node may use the short address to lookup a cryptographic key or other security information stored in the table and then use that information for cryptographic processing (e.g., decryption, authentication, etc.) of the received information. In some cases, the second node may use the short address to lookup QoS information stored in the table and then use that information to receive information and/or to process received information. In some cases, the second node may use the short address to lookup duty cycle information stored in the table and then use that information to receive information and/or to process received information.

In some cases the second node may retrieve the long address of the first node from the lookup table and use the long address in a CRC operation or a message integrity check operation to verify the received information. For example, since a given source address may be maintained separately on a source node and a destination node, it is possible that a mismatch may occur between the information maintained at these nodes. To enable the second node to discover such a mismatch, the first node may use its long address for generating a CRC code of a packet or some other integrity value. The second node may thus be configured to use the long address of the first node to perform a CRC check or other integrity check on the received packet. In some cases, mismatching errors may result in packets being consistently dropped. In such cases, the two nodes may re-assign the short source address to recover from the error. In some cases, the second node may elect to not respond to a received message (e.g., a response is not sent) if the verification fails.

As represented by block 218, in some cases the second node may send a response (e.g., an acknowledgement) to the first node. If so, the operational flow proceeds to block 220. Otherwise the operational flow may proceed to block 226 whereby the node performs other operations (e.g., monitoring for more messages on one or more channels).

At block 220, the second node determines the channel to be used (e.g., determines one or more channel parameters) for responding to the first node. In a similar manner as discussed above, the second node may use the short address received in the message from the first node at block 216 as an index into a lookup table to obtain the channel parameter(s) (e.g., the scheme of FIG. 4 as referenced by the left portion of block 220). Alternatively, the second node may use this short address to obtain the long address of the first node from the table and derive the channel parameter(s) from the long address (e.g., the scheme of FIG. 5 as referenced by the right portion of block 220).

At block 222, the second node transmits the message via the determined channel. In this case, the message may include the short address of the second node (e.g., the short address defined by the first node for the second node at block 204).

At block 224, the first node receives the message via the channel that was defined based on the first node's long address (at blocks 220 and 222). The first node may thus perform operations that are similar to blocks 216-218 such as, for example, identifying the sender of the message (e.g., the second node) and verifying received information based on the short address included in the message.

Figure 3:
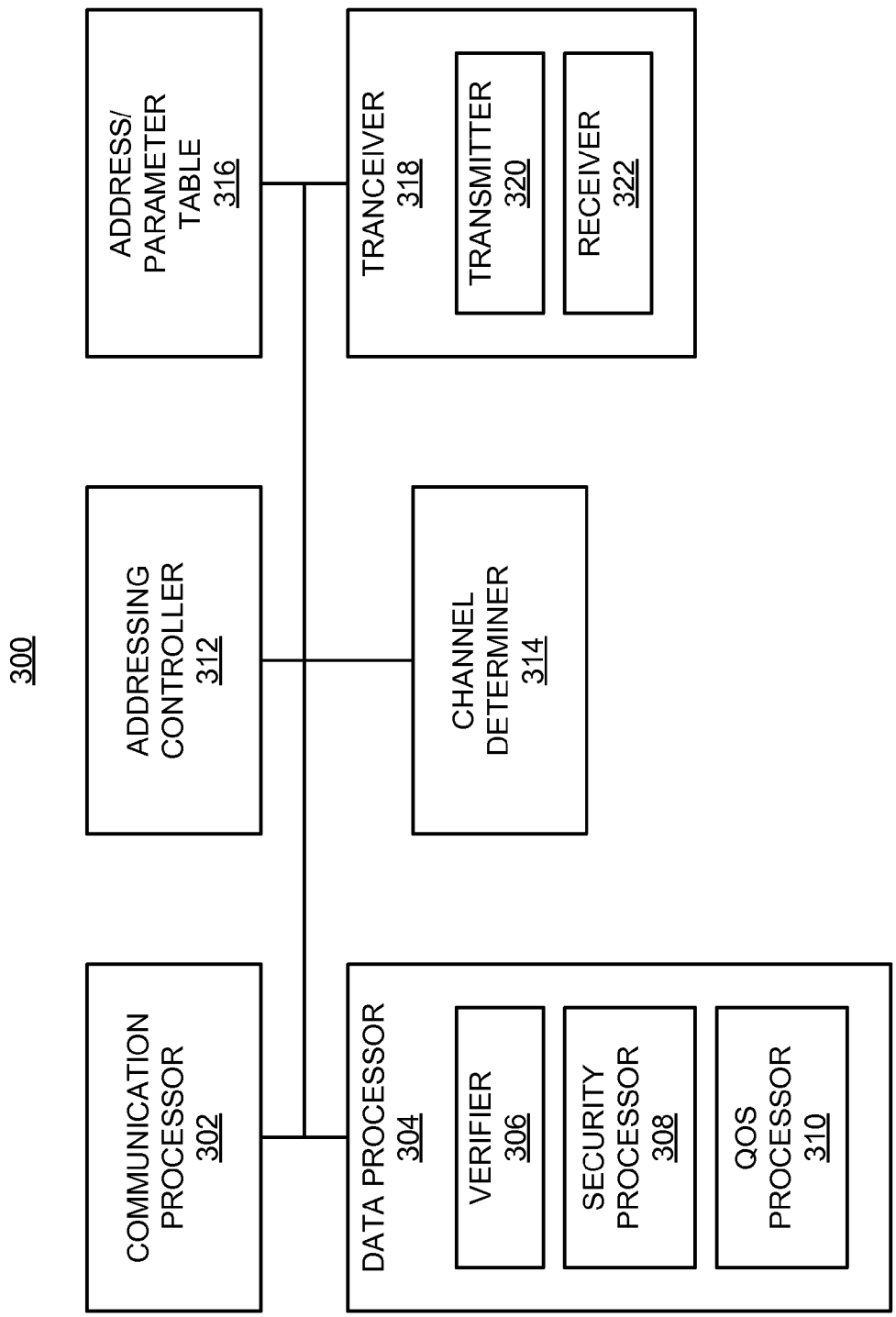
FIG. 3 is a simplified block diagram of several sample components of a node.

FIG. 3 illustrates sample aspects of a node 300 (e.g., an apparatus) including components that may provide functionality relating to the addressing operations described herein (e.g., source node operations and/or destination node operations). For example, the node 300 includes a transceiver 318 for communicating with other nodes. The transceiver 318 includes a transmitter 320 for sending signals (e.g., messages) and a receiver 322 for receiving signals. The node 300 includes a communication processor 302 for managing communications (e.g., generating and processing messages) with other nodes and for providing other related functionality as taught herein. The node 300 includes an addressing controller 312 for managing (e.g., defining and recording associations between) address information (e.g., long and short addresses) and for providing other related functionality as taught herein. In some aspects, the addressing controller 312 may provide at least a portion of the functionality of at least one of: an addressing/channelization processor (e.g., processor 106), the address/parameter processor 402, or the address processor 502 as described herein. The node 300 includes a channel determiner 314 for determining one or more channels (e.g., channel parameters such as channel acquisition code, preamble sequence, time hopping sequence, frequency hopping sequence, pulse repetition frequency, pulse offset, and so on) and for providing other related functionality as taught herein. In some aspects, the channel determiner 314 may provide some or all of the functionality of at least one of: an addressing/channelization processor (e.g., processor 106), the parameter generator 406, or the parameter generator 508 as described herein. The node 300 includes an address/parameter table (e.g., table 408 and/or 506) maintained in a suitable data memory. The node 300 also includes a data processor 304 that may process information to be sent to or that is received from another node. This processing may involve, for example, verification operations (e.g., by a verifier component 306), security processing operations such encryption, decryption, authentication, etc. (e.g., by a security processor component 308), and quality of service-related operations (e.g., by a QOS processor 310). In some aspects, the data processor 304 may be configured to access the table 316 to obtain information used for these and other data processing operations (e.g., to determine information based on a short address).

Figure 6:
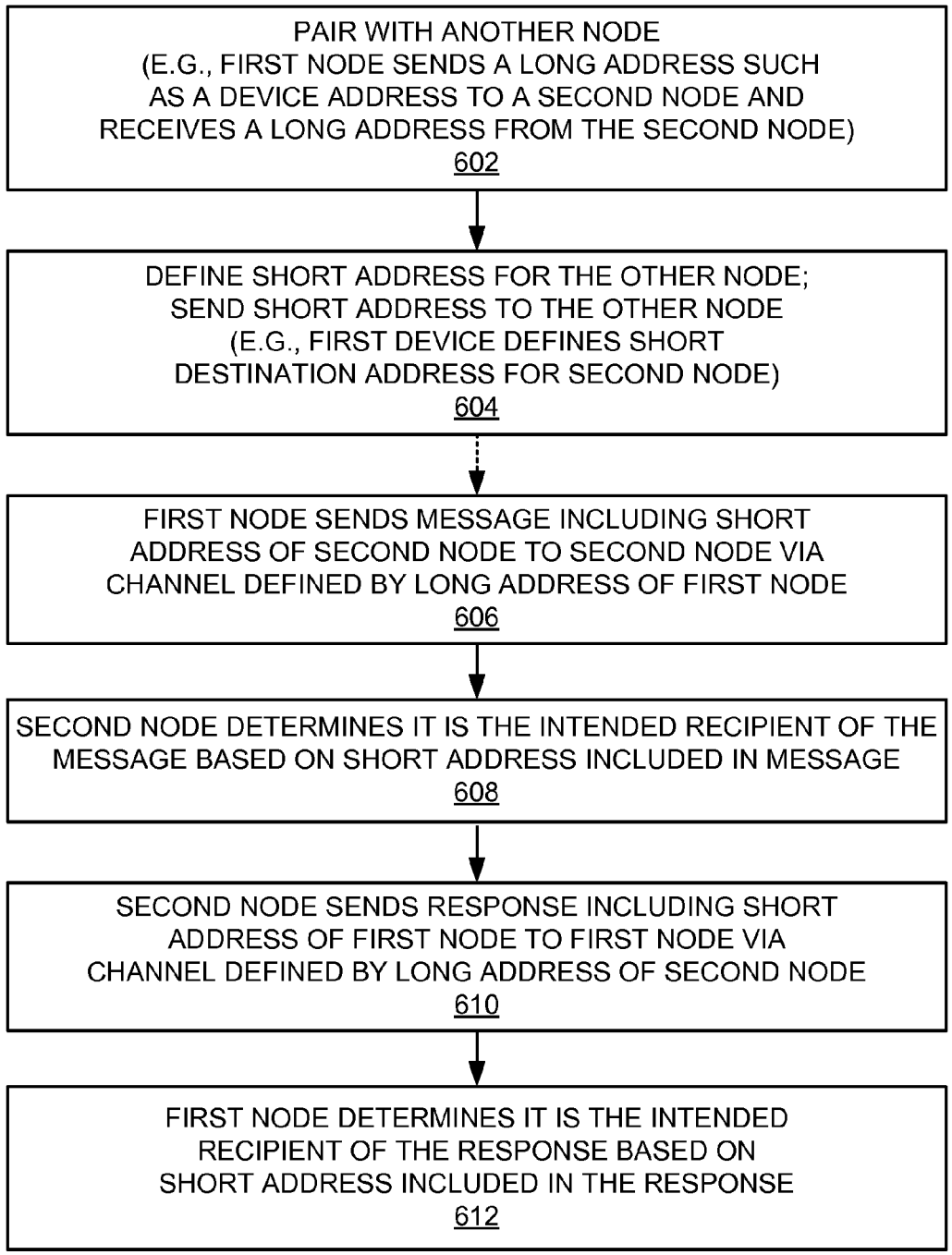
FIG. 6 is a simplified flowchart illustrating sample addressing operations.

It should be appreciated that the teachings herein may be applicable to different types of addressing schemes. For example, FIG. 6 describes sample operations where a channel is defined based on a long address of a source node. In conjunction with these operations, the nodes may perform channelization operations, table lookup operations, address generation operations, data processing (e.g., verification) operations, and other operations that may be similar in some aspects to the operations described above in conjunction with FIGS. 2A, 2B, and 2C. In this case, at block 602 the devices may pair with one other and exchange address information in a similar manner as discussed above a block 202. In addition, a short address is defined for each node at block 604. For example, each node may define a short address for the other node and send it to the other node, or the nodes may cooperate in some other manner to define a short address. In this case, the short address may correspond to a destination address rather than a source address as described above at FIGS. 2A, 2B, and 2C. Here, the short address may be defined such that it enables a given destination node to be uniquely identified. At block 606, at some later point in time, the first node sends a message including a short address of the second node to the second node via a channel defined by the long address of the first node. Here, a lookup table may be used to obtain the channel parameters in a similar manner as discussed herein (e.g., based on a short address of the source). At block 608 the second node may determine that it is the intended recipient of the message based on the short address (e.g., a short destination address) included in the message. At block 610 the second node may send a response including the short address of the first node to the first node via a channel defined by the long address of the second node. Again, a lookup table may be used to obtain the channel parameters. At block 612 the first node may determine whether it is the intended recipient of the response based on the short address included in the response in a similar manner as discussed above.

Figure 7:
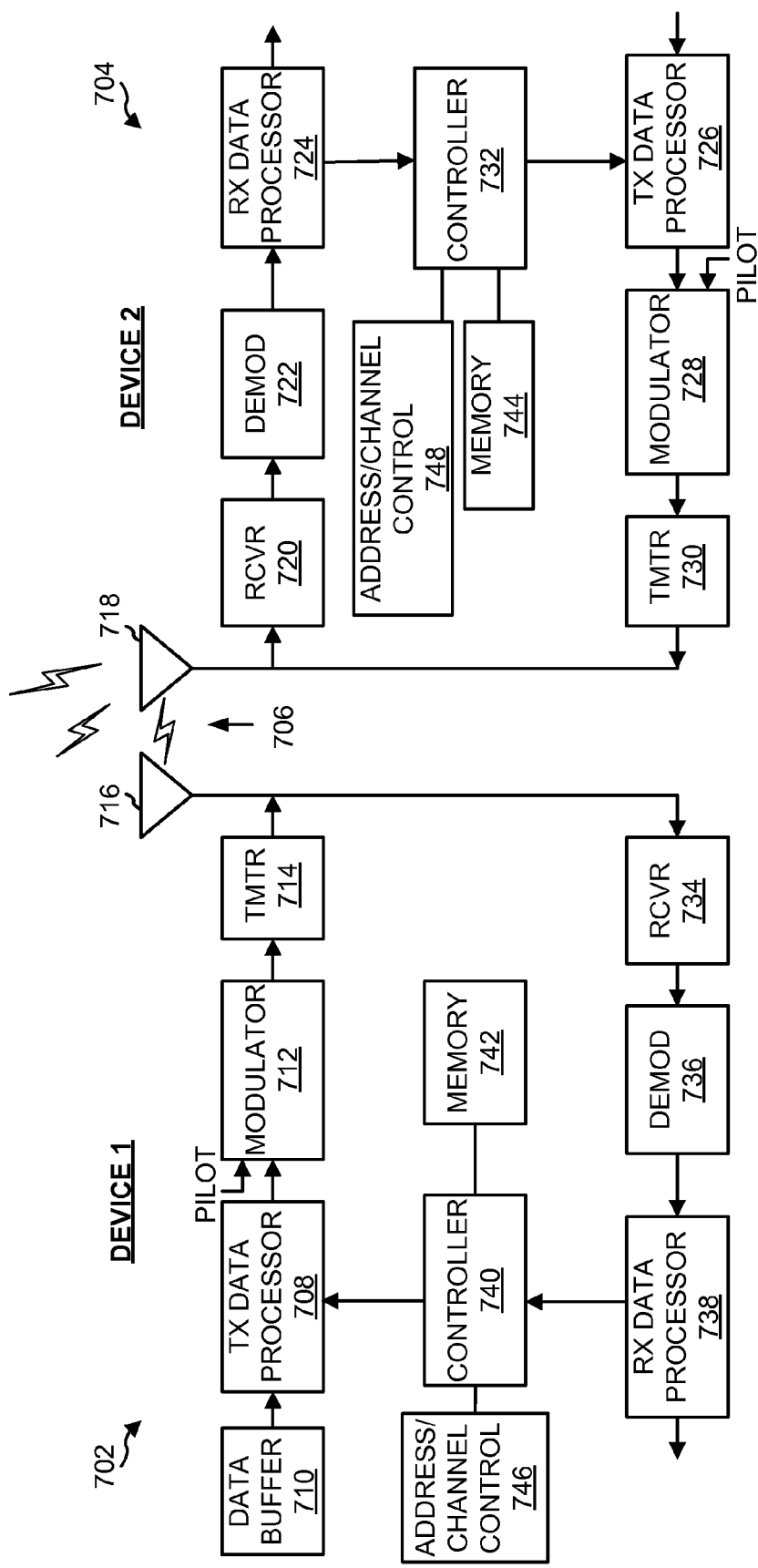
FIG. 7 is a simplified block diagram of several sample aspects of communication components.
Figure 8:
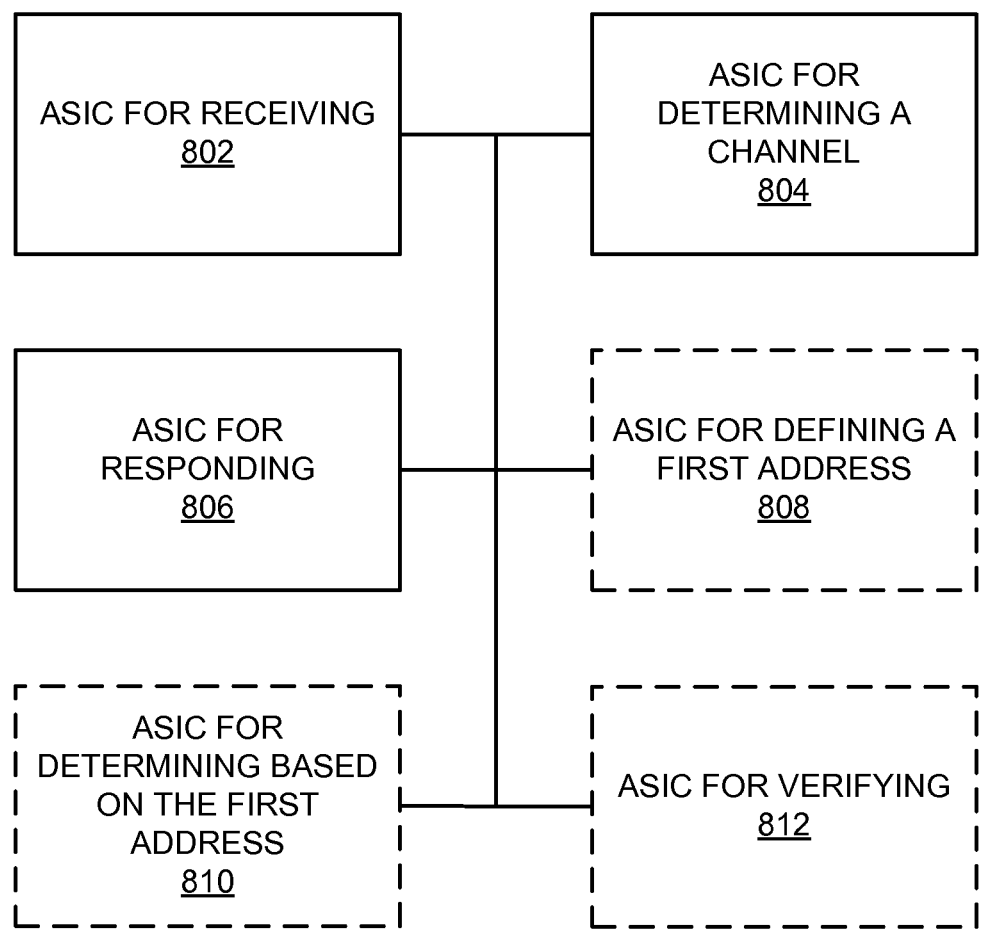
FIGS. 8-11 are simplified block diagrams of several sample aspects of apparatuses configured to support addressing schemes as taught herein.
Figure 9:
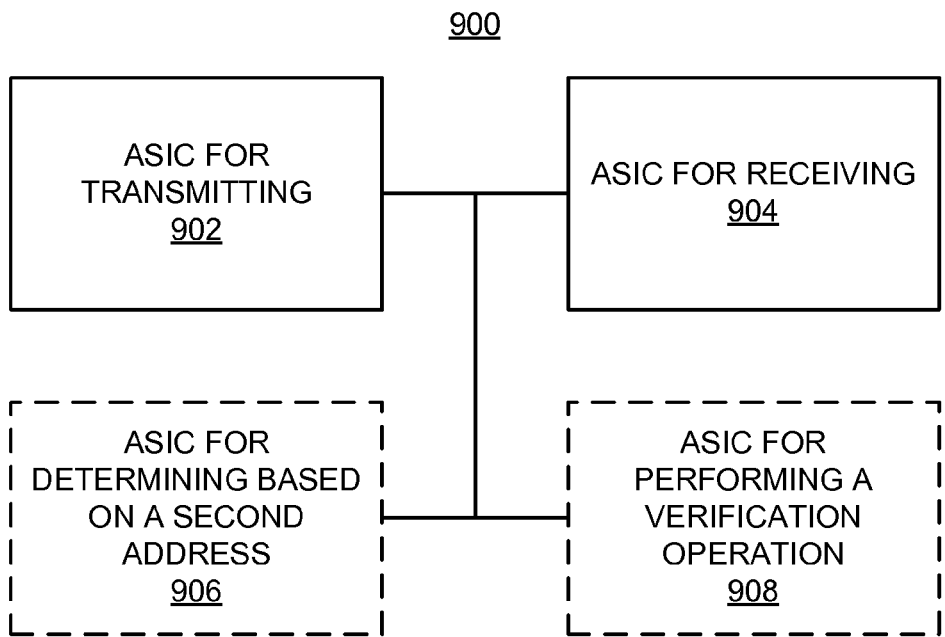
Figure 10:
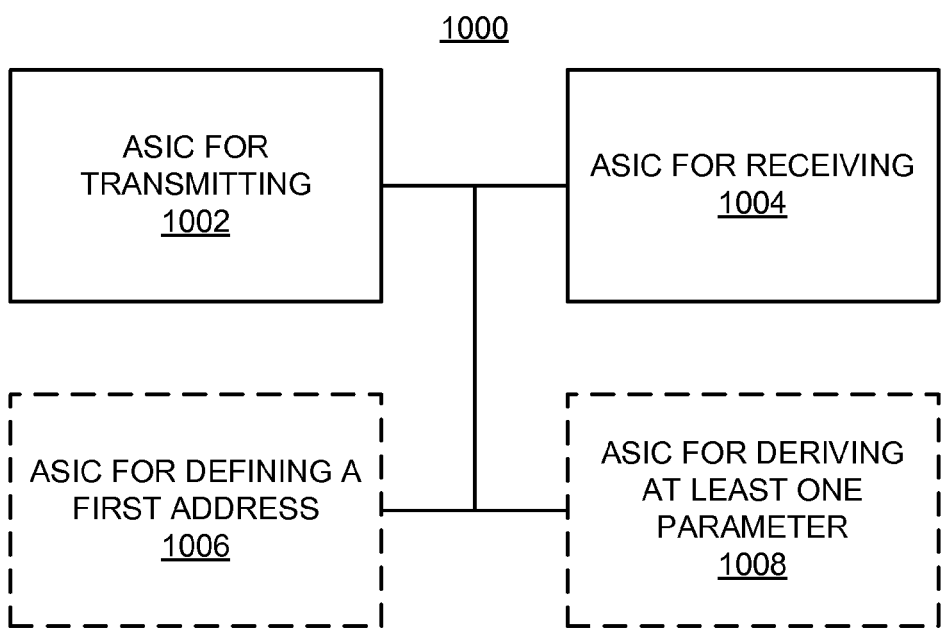
Figure 11:
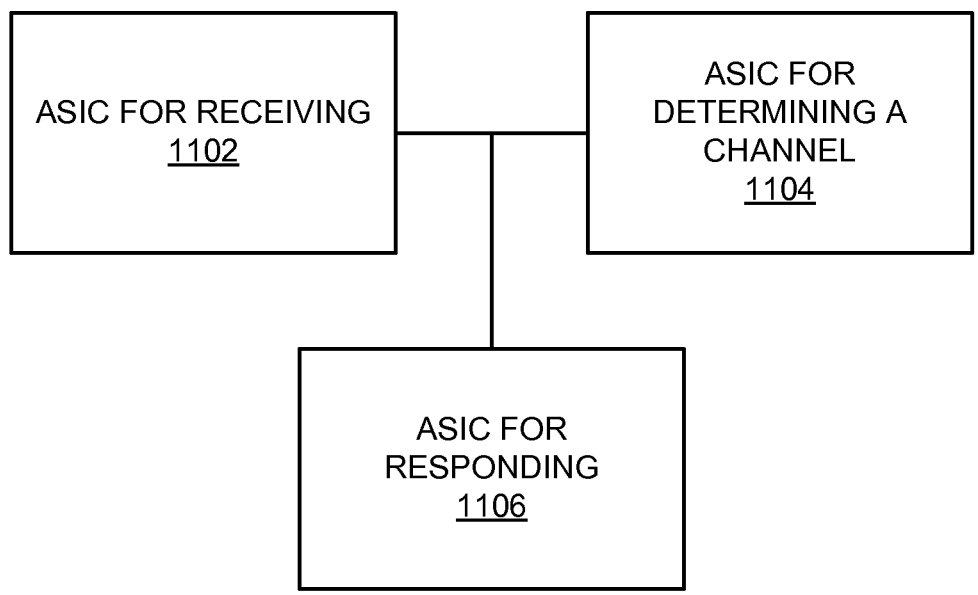

The teachings herein may be incorporated into a device employing various components for communicating with at least one other device. FIG. 7 depicts several sample components that may be employed to facilitate communication between devices. Here, a first device 702 and a second device 704 are adapted to communicate via a wireless communication link 706 over a suitable medium.

Initially, components involved in sending information from the device 702 to the device 704 (e.g., a reverse link) will be treated. A transmit ("TX") data processor 708 receives traffic data (e.g., data packets) from a data buffer 710 or some other suitable component. The transmit data processor 708 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 712 receives the data symbols, pilot symbols, and possibly signaling for the reverse link, and performs modulation (e.g., OFDM or some other suitable modulation) and/or other processing as specified by the system, and provides a stream of output chips. A transmitter ("TMTR") 714 processes (e.g., converts to analog, filters, amplifies, and frequency upconverts) the output chip stream and generates a modulated signal, which is then transmitted from an antenna 716.

The modulated signals transmitted by the device 702 (along with signals from other devices in communication with the device 704) are received by an antenna 718 of the device 704. A receiver ("RCVR") 720 processes (e.g., conditions and digitizes) the received signal from the antenna 718 and provides received samples. A demodulator ("DEMOD") 722 processes (e.g., demodulates and detects) the received samples and provides detected data symbols, which may be a noisy estimate of the data symbols transmitted to the device 704 by the other device(s). A receive ("RX") data processor 724 processes (e.g., symbol demaps, deinterleaves, and decodes) the detected data symbols and provides decoded data associated with each transmitting device (e.g., device 702).

Components involved in sending information from the device 704 to the device 702 (e.g., a forward link) will be now be treated. At the device 704, traffic data is processed by a transmit ("TX") data processor 726 to generate data symbols. A modulator 728 receives the data symbols, pilot symbols, and signaling for the forward link, performs modulation (e.g., OFDM or some other suitable modulation) and/or other pertinent processing, and provides an output chip stream, which is further conditioned by a transmitter ("TMTR") 730 and transmitted from the antenna 718. In some implementations signaling for the forward link may include power control commands and other information (e.g., relating to a communication channel) generated by a controller 732 for all devices (e.g. terminals) transmitting on the reverse link to the device 704.

At the device 702, the modulated signal transmitted by the device 704 is received by the antenna 716, conditioned and digitized by a receiver ("RCVR") 734, and processed by a demodulator ("DEMOD") 736 to obtain detected data symbols. A receive ("RX") data processor 738 processes the detected data symbols and provides decoded data for the device 702 and the forward link signaling. A controller 740 receives power control commands and other information to control data transmission and to control transmit power on the reverse link to the device 704.

The controllers 740 and 732 direct various operations of the device 702 and the device 704, respectively. For example, a controller may determine an appropriate filter, reporting information about the filter, and decode information using a filter. Data memories 742 and 744 may store program codes and data used by the controllers 740 and 732, respectively.

FIG. 7 also illustrates that the communication components may include one or more components that perform ranging operations as taught herein. For example, an address/channel control component 746 may cooperate with the controller 740 and/or other components of the device 702 to send/receive signals to/from another device (e.g., device 704). Similarly, an address/channel component 748 may cooperate with the controller 732 and/or other components of the device 704 to send/receive signals to/from another device (e.g., device 702). It should be appreciated that for each device 702 and 704 the functionality of two or more of the described components may be provided by a single component. For example, a single processing component may provide the functionality of the address/channel control component 746 and the controller 740 and a single processing component may provide the functionality of the address/channel control component 748 and the controller 732.

A wireless device may include various components that perform functions based on signals (e.g., messages) that are transmitted by or received at the wireless device. For example, a wireless headset may include a transducer adapted to provide an audio output based on a message (e.g., a response) received via a receiver. A wireless watch may include a user interface adapted to provide an indication based on a message (e.g., a response) received via a receiver. A wireless sensing device may include a sensor adapted to provide data to be transmitted via a transmitter (e.g., in a message/response).

A wireless device may communicate via one or more wireless communication links that are based on or otherwise support any suitable wireless communication technology. For example, in some aspects a wireless device may associate with a network. In some aspects the network may comprise a personal area network (e.g., supporting a wireless coverage area on the order of 30 meters) or a body area network (e.g., supporting a wireless coverage area on the order of 10 meters) implemented using ultra-wideband technology or some other suitable technology. In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., transmitter 320 and receiver 322) that may include various components (e.g., signal generators and signal processors) that facilitate communication over a wireless medium.

In some aspects a wireless device may communicate via an impulse-based wireless communication link. For example, an impulse-based wireless communication link may utilize ultra-wideband pulses that have a relatively short length (e.g., on the order of a few nanoseconds or less) and a relatively wide bandwidth. In some aspects the ultra-wideband pulses may have a fractional bandwidth on the order of approximately 20% or more and/or have a bandwidth on the order of approximately 500 MHz or more.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical sensing device (e.g., a biometric sensor, a heart rate monitor, a pedometer, an EKG device, a smart bandage, etc.), a user I/O device (e.g., a watch, a remote control, a light switch, a keyboard, a mouse, etc.), an environment sensing device (e.g., a tire pressure monitor), a monitor that may receive data from the medical or environment sensing device, a computer, a point-of-sale device, an entertainment device, a hearing aid, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., an access point) for a communication system. Such an access device may provide, for example, connectivity to another network (e.g., a wide area network such as the Internet or a cellular network) via a wired or wireless communication link. Accordingly, the access device may enable another device (e.g., a wireless station) to access the other network or some other functionality. In addition, it should be appreciated that one or both of the devices may be portable or, in some cases, relatively non-portable. Also, it should be appreciated that a wireless device also may be capable of transmitting and/or receiving information in a non-wireless manner (e.g., via a wired connection) via an appropriate communication interface.

The components described herein may be implemented in a variety of ways. Referring to FIGS. 8-11, apparatuses 800, 900, 1000, and 1100 are represented as a series of interrelated functional blocks that may represent functions implemented by, for example, one or more integrated circuits (e.g., an ASIC) or may be implemented in some other manner as taught herein. As discussed herein, an integrated circuit may include a processor, software, other components, or some combination thereof.

The apparatuses 800, 900, 1000, and 1100 may include one or more modules that may perform one or more of the functions described above with regard to various figures. For example, an ASIC for receiving 802 may correspond to, for example, a receiver as discussed herein. An ASIC for determining a channel 804 may correspond to, for example, a channel determiner as discussed herein. An ASIC for responding 806 may correspond to, for example, a transmitter as discussed herein. An ASIC for defining a first address 808 may correspond to, for example, an addressing controller as discussed herein. An ASIC for determining based on the first address 810 may correspond to, for example, a data processor as discussed herein. An ASIC for verifying 812 may correspond to, for example, a verifier as discussed herein. An ASIC for transmitting 902 may correspond to, for example, a transmitter and/or a communication processor as discussed herein. An ASIC for receiving 904 may correspond to, for example, a receiver as discussed herein. An ASIC for determining based on a second address 906 may correspond to, for example, a data processor as discussed herein. An ASIC for performing a verification operation 908 may correspond to, for example, a verifier as discussed herein. An ASIC for transmitting 1002 may correspond to, for example, a transmitter and/or a communication processor as discussed herein. An ASIC for receiving 1004 may correspond to, for example, a receiver as discussed herein. An ASIC for defining a first address 1006 may correspond to, for example, an addressing controller as discussed herein. An ASIC for deriving at least one parameter 1008 may correspond to, for example, a channel determiner as discussed herein. An ASIC for receiving 1102 may correspond to, for example, a receiver as discussed herein. An ASIC for determining a channel 1104 may correspond to, for example, a channel determiner as discussed herein. An ASIC for responding 1106 may correspond to, for example, a transmitter as discussed herein.

As noted above, in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

As noted above, the apparatuses 800, 900, 1000, and 1100 may comprise one or more integrated circuits. For example, in some aspects a single integrated circuit may implement the functionality of one or more of the illustrated components, while in other aspects more than one integrated circuit may implement the functionality of one or more of the illustrated components.

In addition, the components and functions represented by FIGS. 8-11 as well as other components and functions described herein, may be implemented using any suitable means. Such means also may be implemented, at least in part, using corresponding structure as taught herein. For example, the components described above in conjunction with the "ASIC for" components of FIGS. 8-11 also may correspond to similarly designated "means for" functionality. Thus, in some aspects one or more of such means may be implemented using one or more of processor components, integrated circuits, or other suitable structure as taught herein.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination thereof."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., encoded with codes executable by at least one computer) relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of wireless communication, comprising:
transmitting, by a first node, a message comprising a first address of a second node, wherein the first address is associated with a second address of the second node; and
receiving a response to the message from the second node via a channel, wherein the reception of the response via the channel involves the use of at least one channel parameter that is derived from the second address of the second node.

2. The method of claim 1, further comprising:
defining the first address at the first node; and
sending the first address to the second node prior to the transmission of the message.

3. The method of claim 1, wherein the first address is shorter than the second address.

4. The method of claim 3, wherein:
the first address comprises a destination identifier; and
the second address comprises a device address associated with the second node.

5. The method of claim 1, wherein the derivation of the at least one parameter comprises using the second address as a seed to generate at least one pseudorandom number upon which the at least one parameter is based.

6. The method of claim 1, wherein the at least one parameter comprises at least one of: a channel acquisition code, a time hopping sequence, a frequency hopping sequence, or a pulse repetition frequency.

7. The method of claim 1, wherein the first address expires in conjunction with termination of a connection with the second node.

8. The method of claim 1, wherein:
the first node transmits the message via another channel;
the response comprises a first address of the first node that is associated with a second address of the first node; and
the first node derives at least one parameter of the another channel from the second address of the first node.

9. An apparatus for wireless communication, comprising:
a transmitter configured to transmit a message comprising a first address of a node, wherein the first address is associated with a second address of the node; and
a receiver configured to receive a response to the message from the node via a channel, wherein the reception of the response via the channel involves the use of at least one channel parameter that is derived from the second address of the node.

10. The apparatus of claim 9, further comprising an addressing controller configured to define the first address, wherein the transmitter is further configured to send the first address to the node prior to the transmission of the message.

11. The apparatus of claim 9, wherein the first address is shorter than the second address.

12. The apparatus of claim 11, wherein:
the first address comprises a destination identifier; and
the second address comprises a device address associated with the node.

13. The apparatus of claim 9, wherein the derivation of the at least one parameter comprises using the second address as a seed to generate at least one pseudorandom number upon which the at least one parameter is based.

14. The apparatus of claim 9, wherein the at least one parameter comprises at least one of: a channel acquisition code, a time hopping sequence, a frequency hopping sequence, or a pulse repetition frequency.

15. The apparatus of claim 9, wherein the first address expires in conjunction with termination of a connection with the node.

16. The apparatus of claim 9, wherein:
the transmitter is further configured to transmit the message via another channel;
the response comprises a first address of the apparatus that is associated with a second address of the apparatus; and
the apparatus further comprises a channel determiner configured to derive at least one parameter of the another channel from the second address of the apparatus.

17. An apparatus for wireless communication, comprising:
means for transmitting a message comprising a first address of a node, wherein the first address is associated with a second address of the node; and
means for receiving a response to the message from the node via a channel, wherein the reception of the response via the channel involves the use of at least one channel parameter that is derived from the second address of the node.

18. The apparatus of claim 17, further comprising means for defining the first address, wherein the means for transmitting is configured to send the first address to the node prior to the transmission of the message.

19. The apparatus of claim 17, wherein the first address is shorter than the second address.

20. The apparatus of claim 19, wherein:
the first address comprises a destination identifier; and
the second address comprises a device address associated with the node.

21. The apparatus of claim 17, wherein the derivation of the at least one parameter comprises using the second address as a seed to generate at least one pseudorandom number upon which the at least one parameter is based.

22. The apparatus of claim 17, wherein the at least one parameter comprises at least one of: a channel acquisition code, a time hopping sequence, a frequency hopping sequence, or a pulse repetition frequency.

23. The apparatus of claim 17, wherein the first address expires in conjunction with termination of a connection with the node.

24. The apparatus of claim 17, wherein:
the means for transmitting is configured to transmit the message via another channel;
the response comprises a first address of the apparatus that is associated with a second address of the apparatus; and
the apparatus further comprises means for deriving at least one parameter of the another channel from the second address of the apparatus.

25. A non-transitory computer-program product for wireless communication, comprising:
computer-readable medium encoded with codes executable to:
transmit, at a first node, a message comprising a first address of a second node, wherein the first address is associated with a second address of the second node; and
receive a response to the message from the second node via a channel, wherein the reception of the response via the channel involves the use of at least one channel parameter that is derived from the second address of the second node.

26. A headset, comprising:
a transmitter configured to transmit, a message comprising a first address of a node, wherein the first address is associated with a second address of the node;
a receiver configured to receive a response to the message from the node via a channel, wherein the reception of the response via the channel involves the use of at least one channel parameter that is derived from the second address of the node; and
a transducer configured to provide an audio output based on the response.

27. A watch, comprising:
a transmitter configured to transmit a message comprising a first address of a node, wherein the first address is associated with a second address of the node;
a receiver configured to receive a response to the message from the node via a channel, wherein the reception of the response via the channel involves the use of at least one channel parameter that is derived from the second address of the node; and
a user interface configured to provide an indication based on based on the response.

28. A sensing device, comprising:
a transmitter configured to transmit a message comprising a first address of a node, wherein the first address is associated with a second address of the node;
a receiver configured to receive a response to the message from the node via a channel, wherein the reception of the response via the channel involves the use of at least one channel parameter that is derived from the second address of the node; and
a sensor configured to provide data to be transmitted via the message.

29. A method of wireless communication, comprising:
receiving, at a first node, a message from a second node comprising a first address of the first node, wherein the first address is associated with a second address of the first node;
determining a channel, wherein at least one parameter of the channel is derived from the second address; and
responding to the message via the determined channel.

30. The method of claim 29, wherein the first address is defined at the second node, the method further comprising receiving the first address from the second node prior to the reception of the message.

31. The method of claim 19, wherein the first address is shorter than the second address.

32. The method of claim 31, wherein:
the first address comprises a destination identifier; and
the second address comprises a device address associated with the first node.

33. The method of claim 29, wherein the derivation of the at least one parameter comprises using the second address as a seed to generate at least one pseudorandom number upon which the at least one parameter is based.

34. The method of claim 29, wherein the at least one parameter comprises at least one of: a channel acquisition code, a time hopping sequence, a frequency hopping sequence, or a pulse repetition frequency.

35. The method of claim 29, wherein the first address expires in conjunction with termination of a connection with the second node.

36. The method of claim 29, wherein:
the first node receives the message via another channel;
responding to the message comprises sending another message comprising a first address of the second node that is associated with a second address of the second node; and
at least one parameter of the another channel is derived from the second address of the second node.

37. An apparatus for wireless communication, comprising:
- a receiver configured to receive a message from a node comprising a first address of the apparatus, wherein the first address is associated with a second address of the apparatus;
- a channel determiner configured to determine a channel, wherein at least one parameter of the channel is derived from the second address; and
- a transmitter configured to respond to the message via the determined channel.

38. The apparatus of claim 37, wherein:
- the first address is defined at the node; and
- the receiver is further configured to receive the first address from the node prior to the reception of the message.

39. The apparatus of claim 37, wherein the first address is shorter than the second address.

40. The apparatus of claim 39, wherein:
- the first address comprises a destination identifier; and
- the second address comprises a device address associated with the apparatus.

41. The apparatus of claim 37, wherein the derivation of the at least one parameter comprises using the second address as a seed to generate at least one pseudorandom number upon which the at least one parameter is based.

42. The apparatus of claim 37, wherein the at least one parameter comprises at least one of: a channel acquisition code, a time hopping sequence, a frequency hopping sequence, or a pulse repetition frequency.

43. The apparatus of claim 37, wherein the first address expires in conjunction with termination of a connection with the node.

44. The apparatus of claim 37, wherein:
- the receiver is further configured to receive the message via another channel;
- responding to the message comprises sending another message comprising a first address of the node that is associated with a second address of the node; and
- at least one parameter of the another channel is derived from the second address of the node.

45. An apparatus for wireless communication, comprising:
- means for receiving a message from a node comprising a first address of the apparatus, wherein the first address is associated with a second address of the apparatus;
- means for determining a channel, wherein at least one parameter of the channel is derived from the second address; and
- means for responding to the message via the determined channel.

46. The apparatus of claim 45, wherein:
- the first address is defined at the node; and
- the means for receiving is configured to receive the first address from the node prior to the reception of the message.

47. The apparatus of claim 45, wherein the first address is shorter than the second address.

48. The apparatus of claim 47, wherein:
- the first address comprises a destination identifier; and
- the second address comprises a device address associated with the apparatus.

49. The apparatus of claim 45, wherein the derivation of the at least one parameter comprises using the second address as a seed to generate at least one pseudorandom number upon which the at least one parameter is based.

50. The apparatus of claim 45, wherein the at least one parameter comprises at least one of: a channel acquisition code, a time hopping sequence, a frequency hopping sequence, or a pulse repetition frequency.

51. The apparatus of claim 45, wherein the first address expires in conjunction with termination of a connection with the node.

52. The apparatus of claim 45, wherein:
- the means for receiving is configured to receive the message via another channel;
- responding to the message comprises sending another message comprising a first address of the node that is associated with a second address of the node; and
- at least one parameter of the another channel is derived from the second address of the node.

53. A non-transitory computer-program product for wireless communication, comprising:
- computer-readable medium encoded with codes executable to:
  - receive, at a first node, a message from a second node comprising a first address of the first node, wherein the first address is associated with a second address of the first node;
  - determine a channel, wherein at least one parameter of the channel is derived from the second address; and
  - respond to the message via the determined channel.

54. A headset, comprising:
- a receiver configured to receive a message from a node comprising a first address of the headset, wherein the first address is associated with a second address of the headset;
- a channel determiner configured to determine a channel, wherein at least one parameter of the channel is derived from the second address;
- a transmitter configured to respond to the message via the determined channel; and
- a transducer configured to provide an audio output based on the message.

55. A watch, comprising:
- a receiver configured to receive a message from a node comprising a first address of the watch, wherein the first address is associated with a second address of the watch;
- a channel determiner configured to determine a channel, wherein at least one parameter of the channel is derived from the second address;
- a transmitter configured to respond to the message via the determined channel; and
- a user interface configured to provide an indication based on the message.

56. A sensing device, comprising:
- a receiver configured to receive a message from a node comprising a first address of the sensing device, wherein the first address is associated with a second address of the sensing device; and
- a channel determiner configured to determine a channel, wherein at least one parameter of the channel is derived from the second address.

* * * * *